United States Patent Office 3,214,287
Patented Oct. 26, 1965

3,214,287
METHOD OF AND COMPOSITION FOR IMPREGNATING POROUS METAL CASTINGS
Thomas G. Mosna, 425-C Allen Ave., Glendale, Calif.
No Drawing. Filed Nov. 2, 1962, Ser. No. 235,132
3 Claims. (Cl. 117—49)

The present invention relates to a method and composition for impregnating porous metals.

Industrial bodies which are cast or pressed from bronze, cast iron, aluminum and similar metals are generally porous. When these castings are used for valves and other fittings that convey or control liquids or gases, porosity is a major industrial problem. The economic waste is tremendous and very often forty percent (40%) or more of the castings are rejected because of porosity.

Good castings, even though porous, can be saved by means of impregnation. The impregnation composition must penetrate and seal all the pores of the casting that are permeable to liquids or gases. In order to be efficacious, the impregnation composition must not be adversely affected by gases, oils, or extreme temperatures such as heat and/or refrigeration.

It is very important that every metal casting used to carry or control liquids or gases be impregnated against porosity in order to avoid economic losses. Castings which are not impregnated against porosity may pass normal inspection tests, however, when these untreated castings are put into use, impurities become loosened, cause leaks, and result in fire, explosion, and possible loss of life.

An object of my invention is to provide a method of and a composition for treating metals to permanently seal the same against porosity in all types of metal castings.

A further object is the provision of a method and a composition whereby a metal casting is sealed against porosity in such a manner as to resist high and low temperatures.

A further object is a method and a composition for sealing against porosity in metal castings in such a manner as to resist wet and super heated steam.

A further object is a method and a composition for impregnating metal castings against porosity which resists damage from oil and gases.

A further object is the provision of a method and a composition for sealing metal castings against porosity which is permanent and wherein the sealing composition cannot be loosened from the casting during use.

A further object is the provision of a method and a composition for treating metal castings against porosity which does not require complicated apparatus and wherein the composition used may be prepared by and applied to the castings by semi-skilled personnel.

A further object is the provision of a composition for treating castings against porosity which is non-toxic and non-corrosive and which may be stored in any type of container except paper.

Other objects will appear as the specification proceeds.

I am aware that prior investigators in this art have usually employed a solution of sodium silicate $Na_2SiO_3$ of different ratios and specific gravity. However, sodium silicate used alone in a solution for the treating of porosity in metal castings has the disadvantage that within a short time it is effected by the carbon dioxide in the air and thereby disassociates into siliceous oxide ($SiO_2$) and sodium carbonate ($Na_2CO_3$) with resulting cracks and an imperfect seal. Thus, if sodium silicate is used alone in the treatment of castings, the resultant treatment is of short duration and unsatisfactory.

I have found that it is essential, if a solution of sodium silicate is used, that the solution should, likewise, contain compounds which lower the surface stress of water, accelerate congelation of solution; promote proper adhesion; safety seal all porous channels and be durable.

Accordingly, I intend to use in my method and composition a solution of sodium silicate and in addition, certain compounds to attain the aforesaid desired results. My solution contains the following:

*Formula*

| | Weight units |
|---|---|
| $Na_2SiO_3$, sodium silicate (28–32 Baumé) | 970.00 |
| $Al_2(SO_4)_3$, aluminum sulphate | 12.00 |
| $BaSO_4$, barium sulphate | 1.50 |
| $Na_2SiF_6$, sodium fluosilicate | 2.50 |
| $MnO_2$, oxide of manganese | 3.00 |
| $Co_2O_3$, oxide of cobalt | 1.50 |
| $Bi_2O_3$, oxide of bismuth | 1.00 |
| $Na_2CO_3$, sodium carbonate | 6.00 |
| $Sb_2O_3$, oxide of antimony | 2.50 |

The various compounds which I have indicated in weight units perform important functions in the solution.

Oxide of manganese $MnO_2$ in the weight unit indicated has very important properties when used in the impregnation solution, in that it compensates for any unfavorable effect of oxygen and sulphur found in such metals as bronze, brass, and similar metals used in the production of castings. Oxide of manganese adds toughness and shock resistance to the impregnation composition deposited in the pores of the casting, is a stabilization agent, gives plasticity and further functions as a deoxidizing agent and materially aids in the penetration of all pores or channels of the casting under treatment. Further, it acts to prevent aging of the impregnation composition.

The oxide of bismuth $Bi_2O_3$ has a melting point of 820° C. and readily combines with the metal oxides in the impregnation composition, and aids in maintaining the impregnation ability of the composition even though the thermo limit exceeds the safety factor. The oxide of bismuth forms a slight coat in the casting which protects the metal from further oxidation.

The oxide of antimony $Sb_2O_3$ combines with the other oxides in the sodium silicate solution in the forming of a coating film which has outstanding protection against porosity and corrosion and aids in the sealing of the porous channels of the casting.

Oxide of cobalt $Co_2O_3$ functions in the impregnation composition to hasten drying due to its ability to absorb oxygen. The oxide of cobalt acts as a binding agent with the other oxides present in the impregnation composition and maintains elasticity and longevity of the impregnation composition when deposited in the porous channels of the casting. The presence of the oxide of cobalt gives stability to the impregnation composition, particularly when the casting is exposed to heat.

The remaining compounds added to the impregnation solution or composition includes aluminum sulphate $Al_2(SO_4)_3$; sodium fluosilicate $Na_2SiF_6$; barium sulphate $BaSO_4$; and sodium carbonate $Na_2CO_3$. The function of these particular compounds in the solution are as follows:

The aluminum sulphate $Al_2(SO_4)_3$ plays a very important part in the impregnation composition in that it readily resists atmospheric effects, corrosion and forms adhesive matter as a precipitate which is fast drying. In addition, it aids in rendering the impregnation composition in the porous channels of the casting elastic and prevents eventual cracking of the impregnation material. The aluminum sulphate forms a thin film in the impregnation solution when applied to a casting, which is inert to water and steam when exposed to high temperatures.

Sodium fluosilicate $Na_2SiF_6$ acts in the compression solution or composition as a reactor between positively charged metal oxides in the solution in that the sodium fluosilicate in combining with the metal oxides present removes the electrons therefrom and changes into a compound which is typically saline. Due to the electrochemical properties of sodium fluosilicate, aid is given all compounds of the impregnation solution to form a safe and sure impregnation film. It is resistant to oxidation and assures durability of the impregnation solution.

The barium sulphate $BaSO_4$ is an alkali metal earth. The crystals thereof are stable when exposed to air, heat, or harmful gases for which reason the barium sulphate is an important compound in the impregnation composition.

In the formula, as given, it will be noted that the weight units are fairly low in comparison to the weight unit of sodium silicate. However, the weight units have been carefully determined to the end that all of the metal oxides remain in the solution and cannot evaporate. The combination of the various oxides, together with the other compounds, forms a so-called metal soap and provides a fast and solid protecting film inside the porous channels of the impregnated metal casting body. The oxides named have the capacity to melt and to combine with other metals in the solution to form one solidly combined film. For instance, oxide of cobalt hastens the drying process due to its property of absorbing all oxygen. The oxides do not function separately but function as a combined solution wherein all of the different compounds combine and are dissolved in the sodium silicate.

Preferably, I may utilize a mechanical mixer although I do not restrict my invention to any particular type of mixer. However, I assume use, for the purpose of illustration only, of a mechanical mixer of the three-blade type. The sodium silicate solution of 28–32 Baumé, of the weight indicated, is placed in the mixer and stirred at 120 to 150 r.p.m. During the stirring operation I add the required weight of aluminum sulphate to the sodium silicate solution and mix for eight to ten minutes. I have a definite order of adding the different ingredients of my composition. Aluminum sulphate is added first to the sodium silicate solution for the reason that the presence of other ingredients in the sodium silicate solution prevents complete dissolution of aluminum sulphate in the colloidal solution. The aluminum sulphate crystals contain 18 molecules of water and, hence, very easily combine with the sodium silicate.

Barium sulphate $BaSO_4$ is added to the aforesaid solution after it is assured that the aluminum sulphate has been dissolved in the sodium silicate and the mixing is continued at 120 to 150 r.p.m. The barium sulphate forms a gypsum water and fuses with the already prepared solution of the sodium silicate and aluminum sulphate. Sodium fluosilicate is added to the solution immediately following the addition of the barium sulphate and the speed of the mixer is increased to 200 r.p.m. The barium sulphate and the sodium fluosilicate are both absorbed into the solution of sodium silicate and aluminum sulphate. The mixer speed of 200 r.p.m. continues from ten to twelve minutes and it has been found that the sodium fluosilicate and the barium sulphate have thoroughly penetrated the colloidal solution of sodium silicate. Also, I call attention to the mixer speed for the reason that higher speeds form a foam which is undesirable. Following the addition of the three named ingredients to the sodium silicate solution, oxide of manganese is added in the weight unit indicated and mixed at 200 r.p.m. for three to five minutes. During this time it has been found that the oxide of manganese readily combines with the other ingredients present in the sodium silicate solution. I have a definite order for the addition of the different metal oxides and the oxide of manganese is added first in accordance with its atomic weight which is 54.94. As stated, the metal oxides are added in accordance with atomic weight increase. Thus, the second metal oxide to be added to the solution is oxide of cobalt which has an atomic weight of 58.94. The mixer speed is increased to 280 to 300 r.p.m. for approximately six minutes. The mixer speed is increased above the 200 r.p.m. in order to prevent the oxide of cobalt from falling to the bottom of the mixer bowl and further to assure that the oxide of cobalt may be combined with the other ingredients present in the solution.

Next in the order of atomic weight to be added to the solution is oxide of bismuth which has an atomic weight of 209, and the mixer speed is still maintained at 280 to 300 r.p.m. for four to six minutes. The oxide of bismuth is added last for the reason that this oxide absorbs all of the metal oxides. As I do not desire that the solution should foam at any time, I have indicated the r.p.m. speeds of the mixer and the mixer should always be turned at a speed which does not cause any foaming of the solution, otherwise the oxides and the salts do not combine properly. Furthermore, if the mixer speed is too low, separate lumps of the different compounds may be formed in the solution which is undesirable.

Sodium carbonate in the weight unit indicated is diluted in water in the ratio of one part sodium carbonate to ten parts water which develops a temperature of approximately 20° C. This is a separate operation from the operation previously set forth and the sodium carbonate as a separate solution has added thereto oxide of antimony, which solution is stirred at 300 r.p.m. from four to six minutes to dissolve the oxide of antimony in the sodium carbonate solution. Sodium carbonate is used with antimony to prevent the formation of sediment. The solution of sodium carbonate and oxide of antimony as prepared, is added to the first named solution containing the sodium silicate, aluminum sulphate, barium sulphate, sodium fluosilicate, and the oxides of manganese, cobalt and bismuth and thoroughly mixed for fifteen minutes at a mixer speed of 350 to 380 r.p.m. This solution, prepared as indicated, may be stored in any type of sealed container except paper.

In impregnating porous metal castings, three vats having suitable heating units are provided. Vat No. 1 contains water and four to ten percent caustic soda, which solution is maintained at a temperature of approximately 100° C.

Vat No. 2 contains clear water maintained at a temperature of 100° C.

Vat No. 3 contains the solution of the present invention, as previously described at a temperature at 60° to 70° C.

The usual standard mesh baskets are utilized for immersing the castings into the vats which may, of course, include the usual chain hoists and other lifting equipment to handle the baskets. The castings are placed loosely in a basket and immersed in Vat No. 1 containing the caustic soda solution for approximately thirty seconds. Thereafter, the basket containing the castings is removed for ten seconds and the basket and castings are again immersed in the caustic soda solution thirty seconds, followed by draining thoroughly and immersing the basket in Vat No. 2 containing clear water for thirty seconds. This is followed by removal and draining thoroughly followed by immersing the basket containing the castings in Vat No. 3 containing the solution of the invention for fifteen minutes. After this time period the basket and castings are removed and the castings drained thoroughly making sure that no solution remains in any pockets of the castings. The threads and/or machined surfaces of the castings should be thoroughly cleaned if machining was performed prior to the impregnation process. Under normal circumstances, the castings will be completely dry in thirty minutes and after three hours the castings may be assembled for use.

It is important that the weight of each casting be considered and the time periods indicated in which the castings are within the different solutions. It is based upon a casting weight of one pound. If each casting is heavier than one pound, it is essential that the casting or castings remain in the solution for a longer period of time. Thus in the case of treatment with caustic soda, if the size of the casting is greater than ten pounds of weight, it may be necessary to allow the casting to remain in the caustic soda solution for five minutes in order that the casting should be warm. It is essential that the casting expand so that the interstices or pores in the casting open and allow the caustic soda solution to wash the porous channels or interstices quite thoroughly. The same is true for rinsing. When the castings treated for the first time with caustic soda are removed from the caustic soda solution, the castings contract and upon again inserting the castings in the hot caustic soda solution, the pores or interstices open and impurities therein are loosened from the pores or interstices in the casting. This method assures that all impurities are removed from the pores of the castings. When the castings are washed with hot water, it is essential that the weight of the castings be considered, the same as considered in the immersion thereof within hot caustic soda solution. Thus, in clear hot water with weights up to one pound, the casting or castings should remain at least thirty seconds within the hot water. I am, of course, in this discussion referring to casting size and weight as it is obvious that small castings heat more readily than large castings but it is essential that the entire casting, regardless of size and weight, be heated.

It is important that the impregnation composition have the temperatures indicated; i.e., between 60° and 70° C. The temperature should not be colder than 60° nor much higher than 70° C. as a film may form which prevents penetration of the impregnation solution within the pores or channels of the casting. In other words, castings should not be allowed to cool to an extent which permits the pores or channels to contract and thereby prevent the impregnation composition from penetrating the pores or channels.

After the impregnation of the metal castings has been accomplished, the treated castings are preferably held in a boiler under pressure of about 80 p.s.i. for twenty minutes followed by a release of pressure and a cleaning of the castings. If the castings have threads they should be cleaned preferably by rotary steel brush.

It is obvious that I may express the various ingredients of my composition in percentage by weight if desired, as follows: 97% $Na_2SiO_3$; 1.20% $Al_2(SO_4)_3$; 0.15% $BaSO_4$; 0.25% $Na_2SiF_6$; 0.30% $MnO_2$; 0.15% $Co_2O_3$; 0.10% $Bi_2O_3$; 0.60% $Na_2CO_3$; 0.25% $Sb_2O_3$.

I claim:

1. A composition for impregnating porous metal castings consisting of 28–32 Baumé aqueous solution of

| | Weight units |
|---|---|
| Sodium silicate | 970.00 |
| Aluminum sulphate | 12.00 |
| Barium sulphate | 1.50 |
| Sodium fluosilicate | 2.50 |
| Oxide of manganese | 3.00 |
| Oxide of bismuth | 1.00 |
| Sodium carbonate | 6.00 |
| Oxide of antimony | 2.50 |
| Oxide of cobalt | 1.50 |

2. The process of impregnating porous metal castings which consists in first washing said castings in a water solution of caustic soda maintained at a temperature of approximately 100° C. until the castings are warm; thereafter removing the castings from the solution and washing the same in clear water maintained at a temperature of approximately 100° C.; followed by placing the washed castings in a 60° to 70° C. solution containing

| | Weight units |
|---|---|
| Sodium silicate (28–32 Baumé) | 970.00 |
| Aluminum sulphate | 12.00 |
| Barium sulphate | 1.50 |
| Sodium fluosilicate | 2.50 |
| Oxide of manganese | 3.00 |
| Oxide of cobalt | 1.50 |
| Oxide of bismuth | 1.00 |
| Sodium carbonate | 6.00 |
| Oxide of antimony | 2.50 |

3. The process of forming a composition for the impregnation of porous metal castings consisting of: 28–32 Baumé water solution of sodium silicate—970 weight units, stirring the sodium silicate solution at 120 to 150 r.p.m., adding to said solution during stirring 12 weight units of aluminum sulphate and continuing the stirring to dissolve the aluminum sulphate in the sodium silicate solution; thereafter adding 1.5 weight units of barium sulphate to the aforesaid solution and continuing the stirring of the solution at 120 to 150 r.p.m.; adding to the solution sodium fluosilicate and increasing the stirring speed to 200 r.p.m. for a period of ten to twelve minutes; then adding 3.00 weight units of oxide of manganese; and continuing the stirring for three to five minutes, followed by the addition of 1.5 weight units of oxide of cobalt and 1.00 weight unit of oxide of bismuth, increasing the stirring speed to 300 r.p.m. for four to six minutes; then combining 6.00 weight units of sodium carbonate and 2.50 weight units of oxide of antimony and adding the same to the solution and stirring the solution at 350 to 380 r.p.m. for approximately fifteen minutes.

References Cited by the Examiner

UNITED STATES PATENTS

| | | | |
|---|---|---|---|
| 515,222 | 2/94 | Heil | 117—135.1 X |
| 1,187,746 | 6/16 | Kirchenbayer | 117—135.1 X |
| 1,383,517 | 7/21 | Bezzenberger | 117—135.1 |
| 2,711,974 | 6/55 | Happe | 117—135.1 |
| 2,978,361 | 4/61 | Scidl | 117—135.1 X |

JOSEPH B. SPENCER, *Primary Examiner.*

RICHARD D. NEVIUS, *Examiner.*